(12) United States Patent
Liang et al.

(10) Patent No.: US 10,171,738 B1
(45) Date of Patent: Jan. 1, 2019

(54) STABILIZING VIDEO TO REDUCE CAMERA AND FACE MOVEMENT

(71) Applicant: Google LLC, Mountain View, CA (US)

(72) Inventors: Chia-Kai Liang, San Jose, CA (US); Fuhao Shi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/972,044

(22) Filed: May 4, 2018

(51) Int. Cl.
| | |
|---|---|
| *G06K 9/00* | (2006.01) |
| *H04N 5/222* | (2006.01) |
| *H04N 5/232* | (2006.01) |
| *G06T 7/70* | (2017.01) |

(52) U.S. Cl.
CPC ..... *H04N 5/23258* (2013.01); *G06K 9/00228* (2013.01); *G06K 9/00261* (2013.01); *G06K 9/00281* (2013.01); *G06T 7/70* (2017.01); *H04N 5/2224* (2013.01); *G06T 2207/10016* (2013.01); *G06T 2207/30201* (2013.01); *G06T 2207/30244* (2013.01)

(58) Field of Classification Search
CPC ........... G06K 9/00221; G06K 9/00228; G06K 9/00261; G06K 9/00281; H04N 5/2224; H04N 5/23219; H04N 5/23258; G06T 7/70
USPC ............. 348/222.1, 333.01, 333.02; 382/118
See application file for complete search history.

(56) References Cited

U.S. PATENT DOCUMENTS

| | | | |
|---|---|---|---|
| 4,637,571 A | 1/1987 | Holder et al. | |
| 5,053,876 A | 10/1991 | Blissett et al. | |
| 7,697,725 B2 | 4/2010 | Burns et al. | |
| 8,009,872 B2 | 8/2011 | Kurata | |
| 8,379,932 B2* | 2/2013 | Fukunishi | G06T 7/223 382/107 |
| 8,493,459 B2 | 7/2013 | Albu | |
| 9,674,439 B1 | 6/2017 | Mihic et al. | |
| 10,027,893 B2* | 7/2018 | Bell | H04N 5/23274 |
| 2003/0038927 A1 | 2/2003 | Alden | |

(Continued)

OTHER PUBLICATIONS

'www.wired.com' [online] "Killer Software that Finally Stabilizes Shaky Gopro Videos," Kyle Vanhemert, Aug. 14, 2014 [retrieved on May 15, 2018] Retrieved from Internet: URL<https://www.wired.com/2014/08/killer-software-that-finally-stabilizes-shaky-gopro-videos/> 7 pages.

(Continued)

*Primary Examiner* — Ngoc-Yen Vu
(74) *Attorney, Agent, or Firm* — Fish & Richardson P.C.

(57) ABSTRACT

The subject matter described in this disclosure can be embodied in methods and systems for stabilizing video. A computing system determines a stabilized location of a facial feature in a frame of video accounting for its location in a previous frame. The computing system determines a physical camera pose in virtual space and maps the frame into virtual space. The computing system determines an optimized virtual camera pose using an optimization process that determines (1) a difference between the stabilized location of the facial feature and a location of the facial feature when viewed from a potential virtual camera pose, (2) a difference between the potential virtual camera pose and a previous virtual camera pose, and (3) a difference between the potential virtual camera pose and the physical camera pose. The computing system generates the stabilized view of the frame using the optimized virtual camera pose.

20 Claims, 9 Drawing Sheets

(56) References Cited

U.S. PATENT DOCUMENTS

| | | | |
|---|---|---|---|
| 2004/0036844 | A1 | 2/2004 | Wood |
| 2008/0174822 | A1 | 7/2008 | Kaimi |
| 2013/0121597 | A1 | 5/2013 | Hsu |
| 2017/0111584 | A1 | 4/2017 | Hong et al. |
| 2017/0287221 | A1* | 10/2017 | Ghaly ................. G02B 27/0172 |
| 2017/0357873 | A1* | 12/2017 | Roimela ............ G01C 21/3679 |
| 2018/0181196 | A1* | 6/2018 | Lee ......................... G06F 3/012 |

OTHER PUBLICATIONS

"Homography (computer vision)," From Wikipedia, the free encyclopedia, last modified on Sep. 17, 2015 [retrieved on Oct. 13, 2015]. Retrieved from the Internet: URL<https://en.wikipedia.org/wiki/Homography_(computer_vision)>, 3 pages.

"Image stabilization," From Wikipedia, the free encyclopedia, last modified on Sep. 28, 2015 [retrieved on Oct. 13, 2015]. Retrieved from the Internet: URL<https://en.wikipedia.org/wiki/Image_stabilization#Optical_image_stabilization>, 4 pages.

"Infinite impulse response," From Wikipedia, the free encyclopedia, last modified on Sep. 7, 2015 [retrieved on Oct. 13, 2015]. Retrieved from the Internet: URL<https://en.wikipedia.org/wiki/Infinite_impulse_response>, 4 pages.

Observations by at least some inventors of U.S. Appl. No. 15/972,044, May 14, 2018, 1 page.

Albrecht et al. "Omnidirectional Video Stabilisation on a Virtual Camera Using Sensor Fusion," 11$^{th}$ International Conference Control, Automation, Robotics and Vision, Dec. 2010, 7 pages.

Baker et al., "Removing Rolling Shutter Wobble," Proceedings of the IEEE Conference on Computer Vision and Pattern Recognition, Jun. 2010, 8 pages.

Crawford et al., "Gradient Based Dominant Motion Estimation with Integral Projections for Real Time Video Stabilisation," 2004 International Conference on Image Processing (ICIP), vol. 5, Oct. 2004, 4 pages.

Grundmann et al., "Video Stabilization on YouTube," Google Research Blog, May 4, 2012 [retrieved on Oct. 13, 2015]. Retrieved from the Internet: URL<http://googleresearch.blogspot.de/2012/05/video-stabilization-on-youtube.html>, 7 pages.

Hartley and Zisserman, "Multiple View Geometry in Computer Vision, Second Edition," Cambridge University Press, 2003, pp. 91-112 only.

International Preliminary Report on Patentability issued in International Application No. PCT/US2016/053252, dated Apr. 26, 2018, 9 pages.

International Search Report and Written Opinion in International Application No. PCT/US2016/053252, dated Dec. 23, 2016, 14 pages.

Koppel et al., Robust and Real-Time Image Stabilization and Rectification, Application of Computer Vision, 2005. WACV/MOTIONS '05 vol. 1. Seventh IEEE Workshops on, Jan. 2005, 6 pages.

Lavry, "Understanding IIR (Infinite Impulse Response) Filters—An Intuitive Approach," Lavry Engineering, 1997, 5 pages.

Liu and Jin, "Content-Preserving Warps for 3D Video Stabilization," ACM Transactions on Graphics (TOG)—Proceedings of ACM SIGGRAPH 2009, vol. 28, Issue 3, Article No. 44, Aug. 2009, pp. 1-9.

Liu et al. "Bundled camera paths for video stabilization," ACM Transactions on Graphics, vol. 32, Jul. 11, 2013, 10 pages.

Ma et al. "Video Stabilization and Face Saliency-based Retargeting," 2016, [retrieved on May 15, 2018] Retrieved from Internet: URL<https://pdfs.semanticscholar.org/9b07/2713e678bd4b80d92e7f147ad87b2ec2f22c.pdf?_ga=2.155832379.1079424380.1526408964-2141874779.1512576219> 7 pages.

Rawat and Singhai, "Review of Motion Estimation and Video Stabilization techniques for hand held mobile video," Signal & Image Processing: An International Journal (SIPIJ) 2(2), Jun. 2011, 12 pages.

Roth, "Homography," ECCD, COMP 4900, Class Note, Fall 2009, 22 pages.

Tian and Narasimhan, "Globally Optimal Estimation of Nonrigid Image Distortion," International journal of computer vision, 98(3), Jul. 2012, 27 pages.

Unknown Author, "The Homography transformation," CorrMap, 2013 [retrieved on Oct. 13, 2015]. Retrieved from the Internet: URL<http://www.corrmap.com/features/homography_transformation.php>, 5 pages.

Wei et al. "Relative Pose Estimation Algorithm with Gyroscope Sensor," Journal of Sensors vol. 2016, Article ID 8923587 Oct. 27, 2016, 9 pages.

Wilkie, "Motion stabilisation for video sequences," Imperial College London, Department of Computing, Final Year Project, Jun. 18, 2003, 63 pages.

Won-Ho Cho et al. "CMOS Digital Image Stabilization," IEEE Transactions on Consumer Electronics, IEEE Service Center, New York, NY, US, vol. 53 No. 3, Aug. 1, 2007, 8 pages.

* cited by examiner

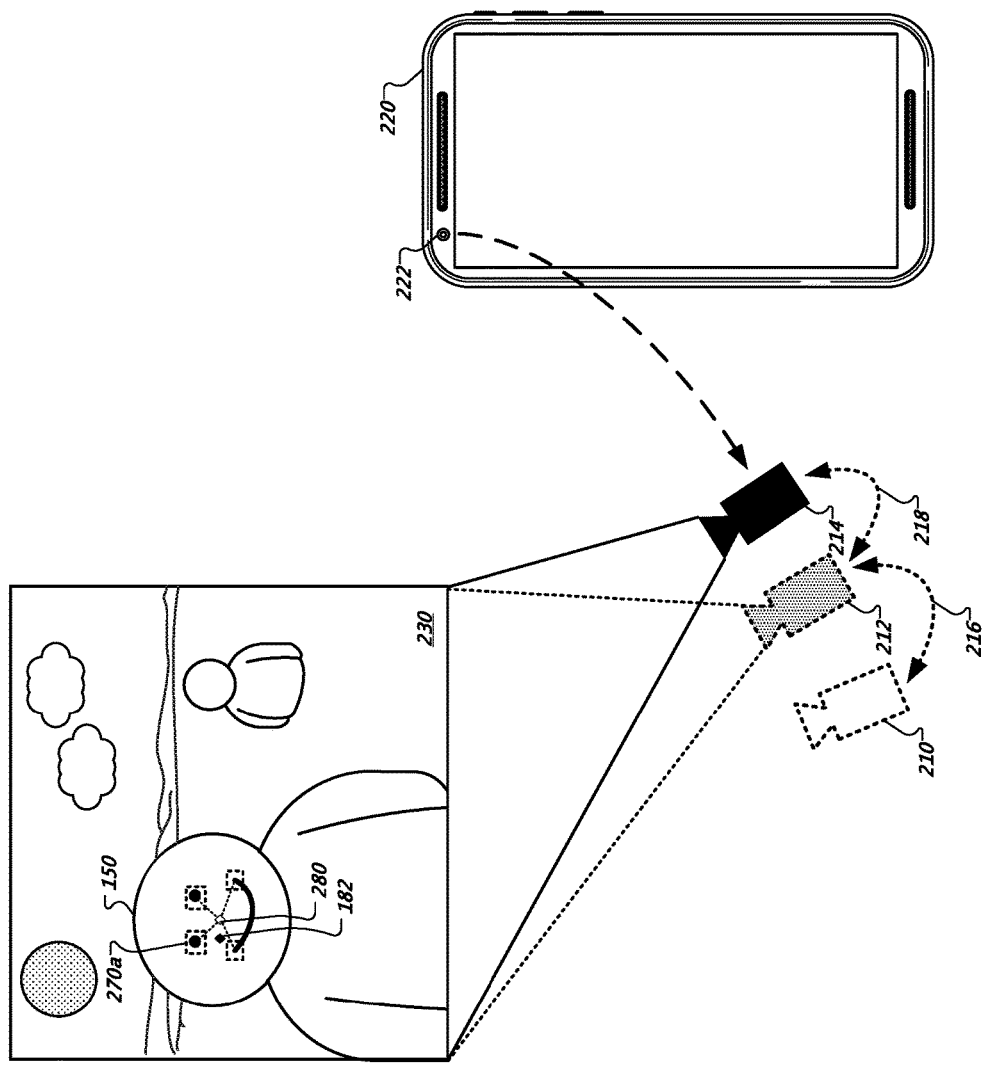

STABILIZING VIDEO TO REDUCE CAMERA AND FACE MOVEMENT

TECHNICAL FIELD

This document discusses stabilizing video to reduce camera and face movement.

BACKGROUND

Various types of recording devices, such as video cameras and smartphones, include image sensors that can be used to record video. A video may be generated by capturing a sequence of images, which are often called video "frames" and which are typically captured at a defined frame rate (e.g., thirty frames per second). The captured sequence of frames may be presented by a display device at the same frame rate, and the switching from a presentation of one frame to a presentation of another frame may go largely unnoticed by humans, such that the display may appear to present actual motion rather than a sequence of quickly-switching images.

Recording devices are sometimes subject to unintentional movement during recording, for example, shaking that results from the recording device being handheld by a person or attached to a moving vehicle. Such movement can have a particularly significant effect on a video when the movement is rotational and the scene being captured is far away from the recording device.

Various techniques can stabilize video to limit unintentional movement of a recording device. One technique to stabilize video is mechanical stabilization, in which mechanical actuators counteract external forces. Mechanical stabilization can be implemented by mounting the recording device to a secondary device that stabilizes movement of the entire recording device (e.g., a gimbal). Mechanical stabilization can also be implemented by integrating actuators within the recording device to stabilize the camera or portions thereof with respect movement of the main body of the recording device. Another technique to stabilize video is digital video stabilization, in which a computer analyzes video that has been recorded and crops the captured frames in a manner that produces a partially-zoomed-in version of the video that is stabilized. Mechanical stabilization and digital video stabilization techniques may be combined.

SUMMARY

This document describes techniques, methods, systems, and other mechanisms for stabilizing video to reduce camera and face movement. In general, the mechanisms described herein can generate a stabilized version of a video by determining a virtual recording pose (a virtual camera location and orientation) that provides a more stable recording experience than the actual pose of the physical camera. The virtual recording pose may be determined to counteract not only undesired physical movement of the camera, but also movement of a face in the scene. A computerized process can warp a frame that was captured by the physical camera so that the frame appears to have been captured from the virtual recording pose rather than the actual pose of the physical camera, with the virtual recording pose being laterally offset in virtual space from the pose of the physical camera. This process may be repeated for each frame to produce a stabilized video.

Stabilizing movement of a face in addition to movement of a camera can provide better stabilization results in various circumstances. For example, suppose that a user is taking a video with a front-facing camera of a smartphone (e.g., a "selfie") while riding in a vehicle. The vehicle may cause both the camera and the user to bounce. A video stabilization mechanism that stabilizes only physical movement of the camera may actually be counterproductive in such a situation because the user's face may continue to bounce even if the camera location were stabilized.

The technology described herein can stabilize video to minimize unintentional movement of both the camera and one or more objects. As such, the need for mechanical stabilization may be reduced or eliminated, which can lower manufacturing expenses and the space required to house a camera in a recording device. Alternatively, stabilization may be enhanced if both mechanical and digital video stabilization are used. Another benefit is that a user of a recording device may not have to concentrate on stabilizing movement of the recording device or a subject of the video, and may focus on other aspects of the video-taking experience.

As additional description to the embodiments described below, the present disclosure describes the following embodiments.

Embodiment 1 is a computer-implemented video stabilization method. The method comprises receiving, by a computing system, a video stream that includes multiple frames and that was captured by a physical camera. The method comprises determining, by the computing system and in a frame of the video stream that was captured by the physical camera, a location of a facial feature of a face that is depicted in the frame. The method comprises determining, by the computing system, a stabilized location of the facial feature, taking into account a previous location of the facial feature in a previous frame of the video stream that was captured by the physical camera. The method comprises determining, by the computing system and using information received from a movement or orientation sensor coupled to the physical camera, a pose of the physical camera in a virtual space. The method comprises mapping, by the computing system, the frame of the video stream that was captured by the physical camera into the virtual space. The method comprises determining, by the computing system, an optimized pose of a virtual camera viewpoint in the virtual space from which to generate a stabilized view of the frame, using an optimization process. The optimization process determines a difference between the stabilized location of the facial feature and a location of the facial feature in a stabilized view of the frame viewed from a potential pose of the virtual camera viewpoint. The optimization process determines a difference between the potential pose of the virtual camera viewpoint in the virtual space and a previous pose of the virtual camera viewpoint in the virtual space. The optimization process determines a difference between the potential pose of the virtual camera viewpoint in the virtual space and the pose of the physical camera in the virtual space. The method comprises generating, by the computing system, the stabilized view of the frame using the optimized pose of the virtual camera viewpoint in the virtual camera space.

Embodiment 2 is the computer-implemented video stabilization method of embodiment 1, further comprising presenting, by the computing system, the stabilized view of the frame on a display of the computing system.

Embodiment 3 is the computer-implemented video stabilization method of embodiment 1, wherein the movement or orientation sensor comprises a gyroscope.

Embodiment 4 is the computer-implemented video stabilization method of embodiment 1, wherein the computing system determines the location the facial feature of the face that is depicted in the frame based on locations of multiple respective facial landmarks that are depicted in the frame. Moreover, the computing system determines the difference between the stabilized location of the facial feature and the location of the facial feature in the stabilized view of the frame by measuring deviations between locations of the multiple facial landmarks in the stabilized view of the frame and the stabilized location of the facial feature.

Embodiment 5 is the computer-implemented video stabilization method of embodiment 1, wherein the optimization process comprises a non-linear computational solver that optimizes values for multiple respective variables.

Embodiment 6 is the computer-implemented video stabilization method of embodiment 1, wherein the optimization process determines an amount of undefined pixels in the stabilized view of the frame that is generated using the potential pose of the virtual camera view point in the virtual space.

Embodiment 7 is the computer-implemented video stabilization method of embodiment 1, wherein the optimization process determines a difference between (a) an offset of a principal point of the stabilized view of the frame that is generated using the potential pose of the virtual camera view point in the virtual space, and (b) an offset of a previous principal point of a previous stabilized view of the frame that was generated using the previous pose of the virtual camera viewpoint in the virtual space.

Embodiment 8 is the computer-implemented video stabilization method of embodiment 1, wherein generating the stabilized view of the frame includes mapping a subset of scanlines of the frame to perspectives viewed from the optimized pose of the virtual camera viewpoint, and interpolating other of the scanlines of the frame.

Embodiment 9 is the computer-implemented video stabilization method of embodiment 1. The method comprises selecting the face that is depicted in the frame of the video stream that was captured by the physical camera as a face to track from among multiple faces depicted in the frame of the video stream that was captured by the physical camera by: (i) selecting the face based on sizes of each of the multiple faces, (ii) selecting the face based on distances of each of the multiple faces to a center of the frame, or (iii) selecting the face based on distances between a face selected for tracking in a previous frame and each of the multiple faces.

Embodiment 10 is the computer-implemented video stabilization method of embodiment 1, wherein the optimized pose of the virtual camera viewpoint has a different location and rotation in the virtual space than the pose of the physical camera.

Embodiment 11 is directed to one or more computer-readable devices having instructions stored thereon, that when executed by one or more processors, cause the performance of actions according to the method of any one of embodiments 1 through 10.

Embodiment 12 is directed to a system that includes one or more processors and one or more computer-readable devices having instructions stored thereon, that when executed by the one or more processors, cause the performance of actions according to the method of any one of embodiments 1 through 10.

The details of one or more implementations are set forth in the accompanying drawings and the description below. Other features, objects, and advantages will be apparent from the description and drawings, and from the claims.

DESCRIPTION OF DRAWINGS

FIG. 2 shows viewpoints of physical and virtual cameras in virtual space, and a frame mapped into virtual space.

Like reference symbols in the various drawings indicate like elements.

DETAILED DESCRIPTION

Figure 1:
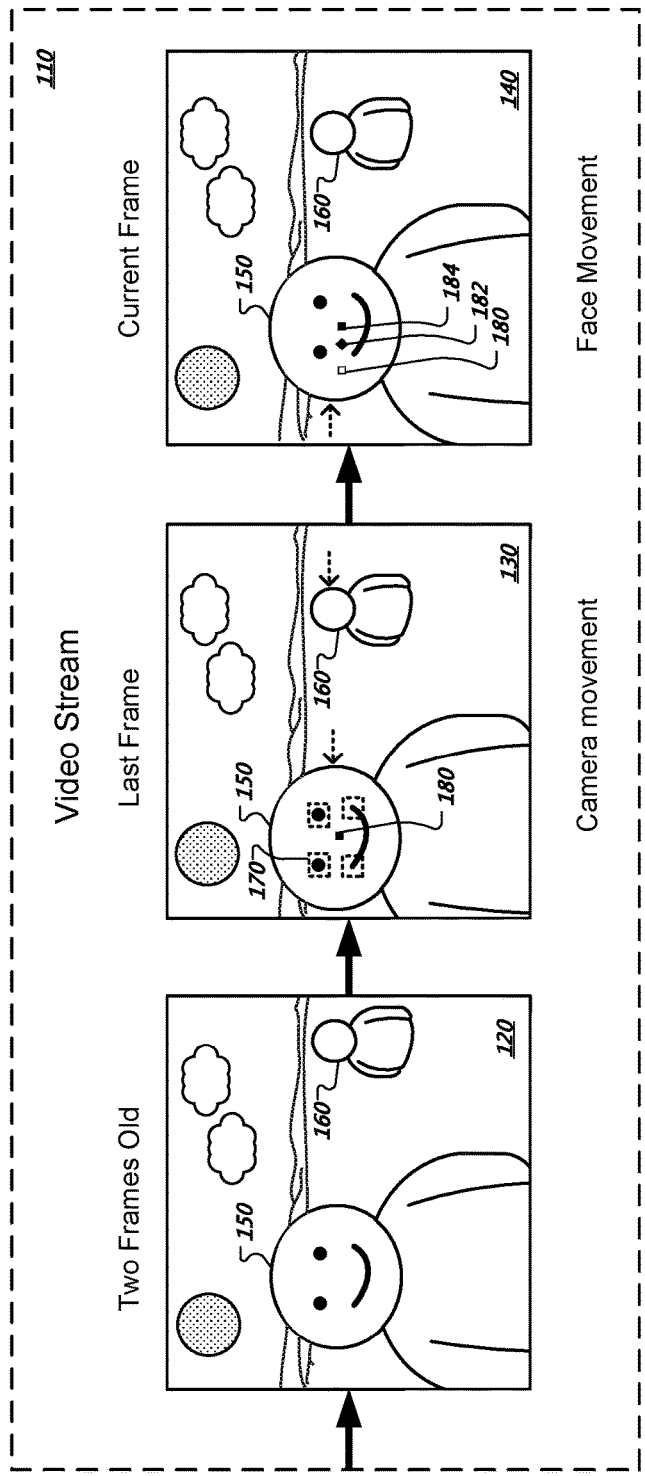
FIG. 1 shows frames of a video stream and movement of objects represented within the frames of the video stream.

This document generally describes stabilizing a video to reduce camera and object movement. Techniques described herein warp frames of a video so that the frames appear to have been taken from a pose of a stabilized virtual camera viewpoint rather than a pose of the physical camera that captures the frames. The process that determines the pose of the virtual camera viewpoint can account for a current pose of the physical camera, a previous pose of the virtual camera viewpoint, and a location of a face in the scene.

The location of the human face in the scene may matter, because the human face may move with respect to a camera, even if the location of that camera were stabilized (e.g., either mechanically or using digital stabilization techniques). Movement of a person's face may be particularly noticeable when the person is close to the camera, such as when the person is taking a "selfie," because the person's face in such circumstances may occupy a sizable portion of the frame.

The techniques described herein, can calculate the location of a person's face in a video, determine how that face moves from one frame to the next, and determine a "stabilized" location of the person's face in a most-recently-received frame of the video. The stabilized location of the person's face may be a location at which the person's face would be located if movement of the person's face were smoothed, such as if someone had grabbed that person by the shoulders to limit any shaking and slow any sudden movements. The video stabilization process, in selecting a pose for the virtual camera viewpoint, may take into account the stabilized location of the person's face.

More broadly, the video stabilization process can take into account multiple different factors in selecting the pose for the virtual camera viewpoint. A first factor is a pose of the physical camera, as determined using one or more sensors of the camera that identify movement and/or rotation of the camera (e.g., a gyroscope). A second factor is a pose determined for the virtual camera in the last frame. Absent other factors, the determined pose of the virtual camera viewpoint would likely be located somewhere between the pose of the physical camera and the previous pose of the virtual camera viewpoint.

One of these other factors is a distance between the stabilized location of the person's face (determined as discussed above) and the location of the person's face in the video frame, when the video frame is warped so that it appears to have been taken from the perspective of the virtual camera viewpoint. As a simple illustration, a person may have moved his or her face to one side very quickly, which may cause the recording device to determine that a stabilized location of the face should be in between the previous location of the face and the actual location of the face. The impact of the sudden face shift on the recorded video may be reduced by moving the virtual camera viewpoint in the same direction that the face moved, so that the movement of the person's face, at least within the stabilized video, is reduced.

As such, the video stabilization techniques described herein can account for multiple different factors to select an optimized pose for a virtual camera viewpoint, and once that pose has been selected, can warp a frame of video so that the video can appear to have been taken from the optimized pose of the virtual camera viewpoint rather than the pose of the physical camera (with both the location and orientation of the virtual camera viewpoint being different from the location and orientation of the physical camera in virtual space, in some examples). The process may be repeated for each frame of a video, to generate a video that appears to have been captured from a virtual camera that moved more in a more stable manner than the physical camera. The process may not require analysis of future frames, and therefore may be performed in real-time as the video is being captured. As such, the video that appears on a display of the recording device while the recording device is recording video may be the stabilized video.

The following description explains such video stabilization techniques in additional detail with respect to the figures. The description will generally follow the flowchart of FIGS. 3A-E, which describes a process for stabilizing video to reduce camera and face movement. The description of that flowchart will reference FIGS. 1 and 2, to illustrate various aspects of the video stabilization techniques. FIG. 1 shows frames of the video and the movement of objects from one frame to the next. FIG. 2 shows the hardware that records the video, and illustrates how that hardware and the virtual camera viewpoint change over time as frames are captured.

Figure 3A:
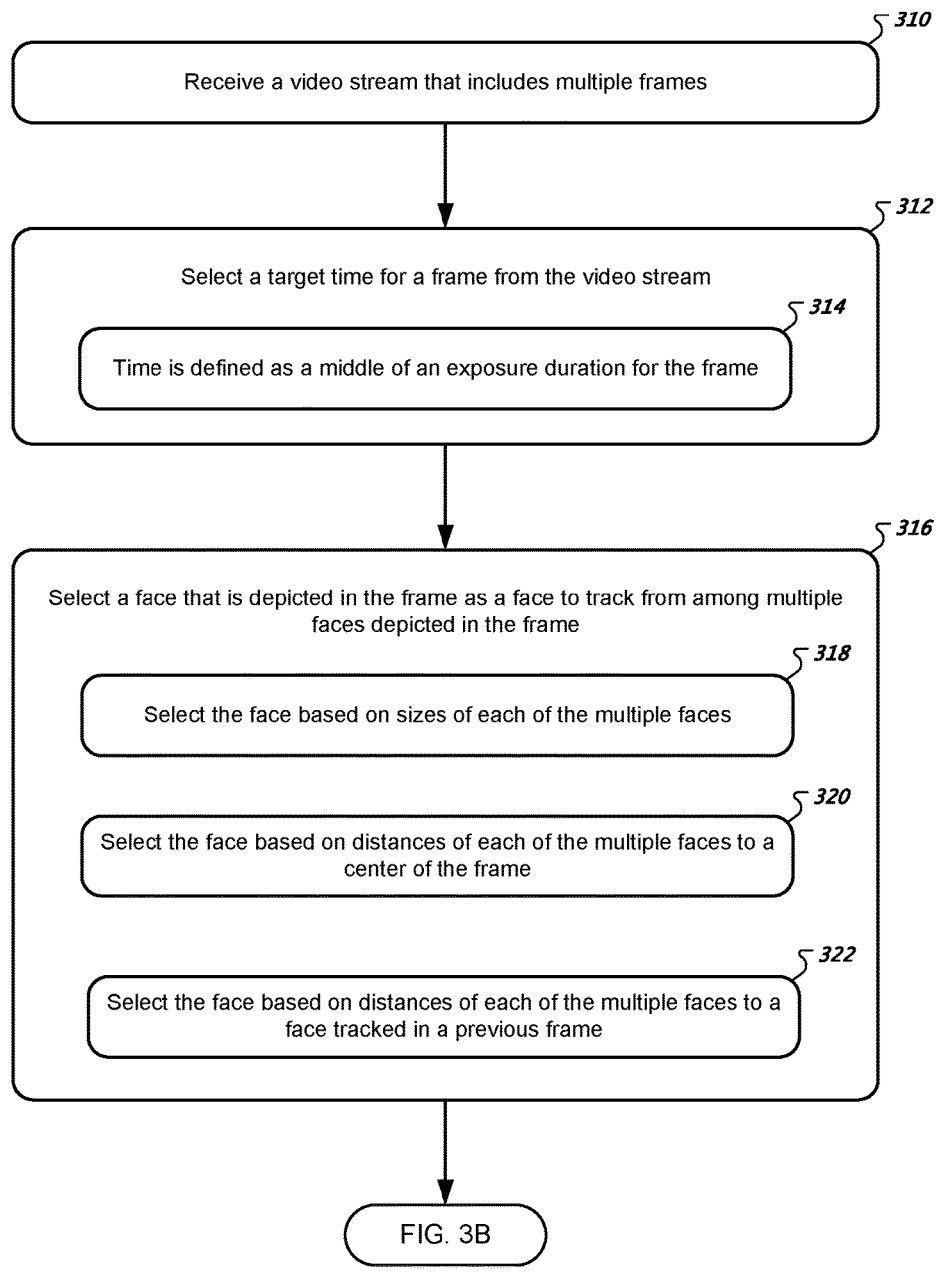
FIGS. 3A-E show a flowchart of a process for stabilizing video to reduce camera and face movement.
Figure 3B:
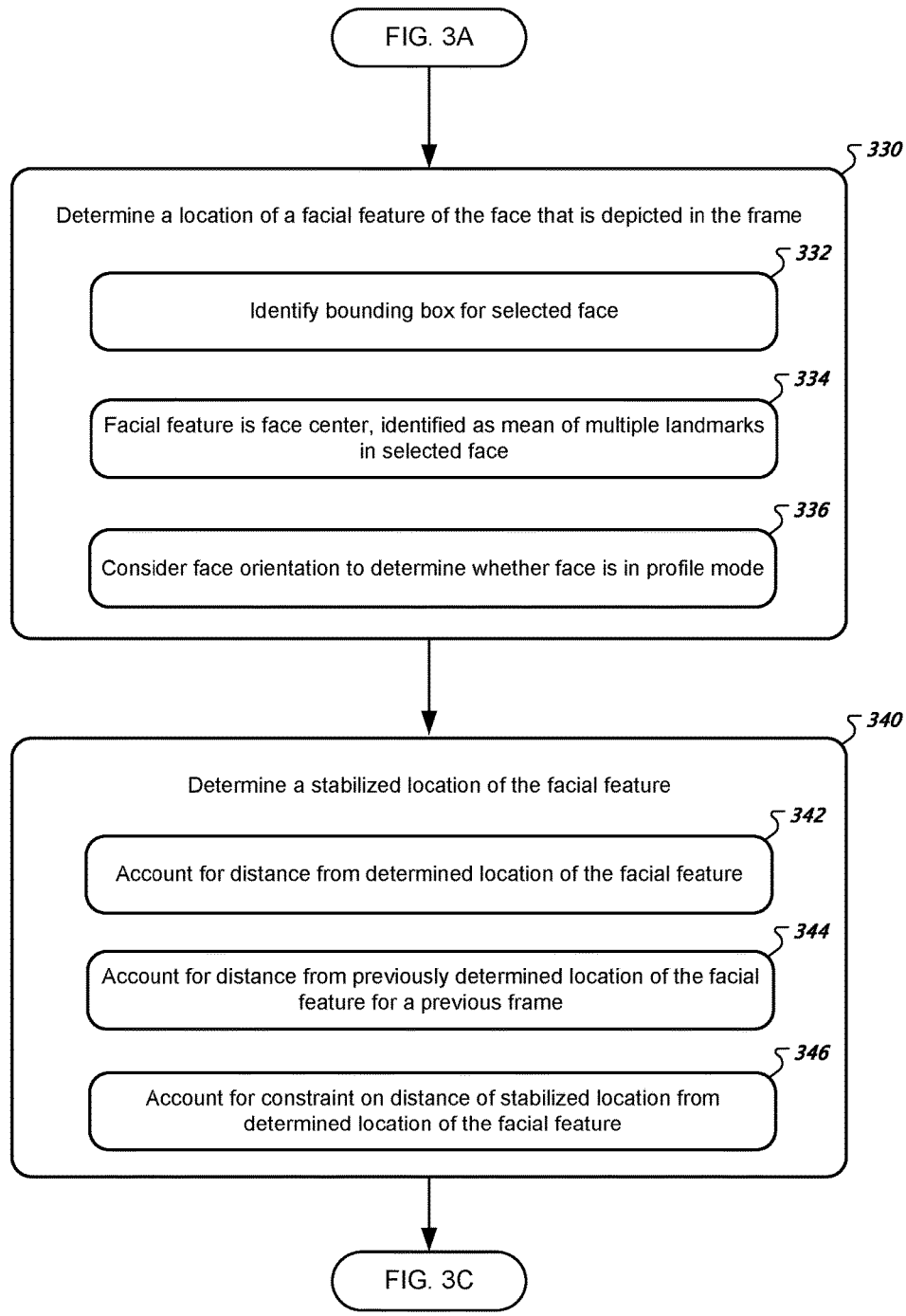
Figure 3C:
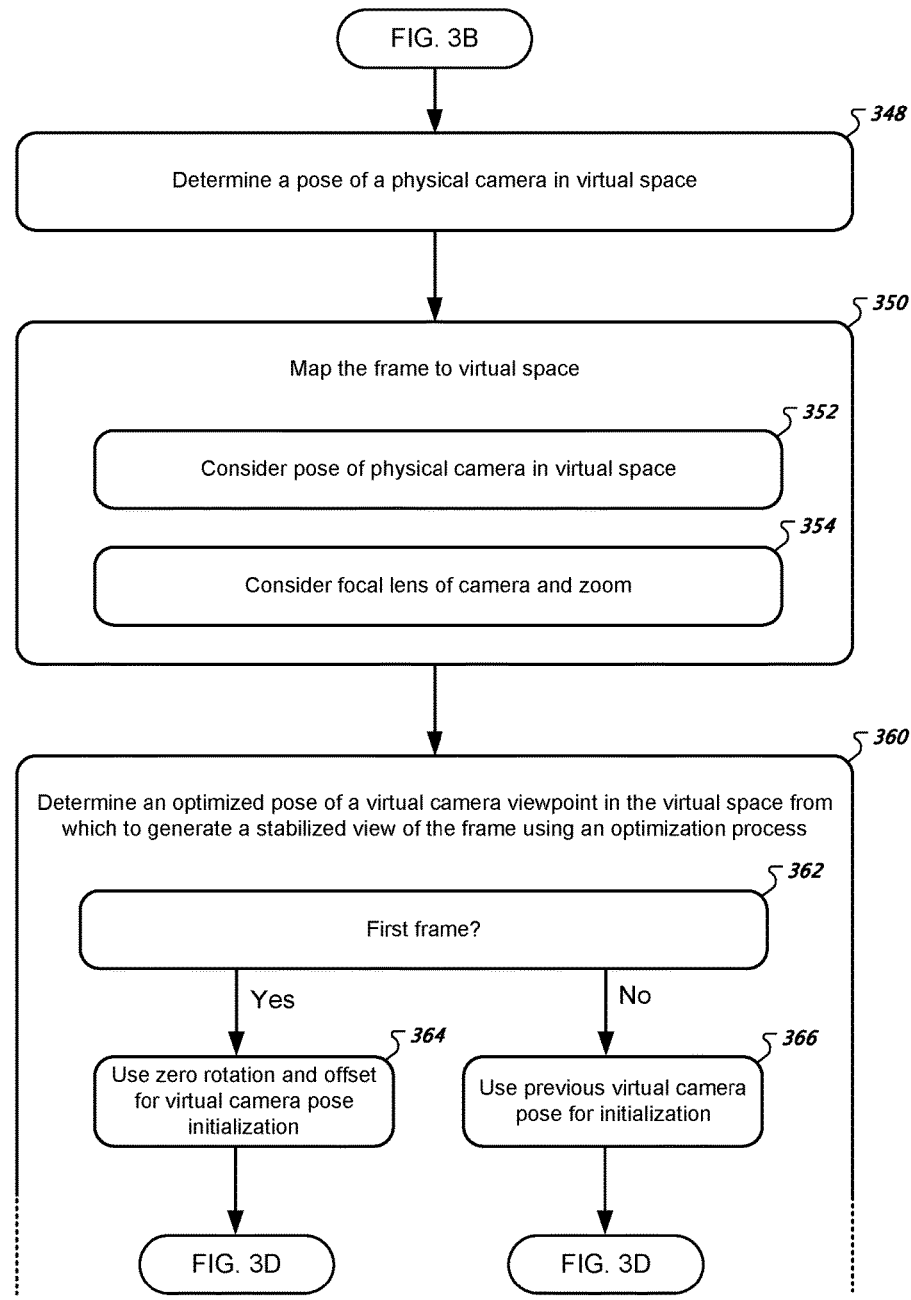
Figure 3D:
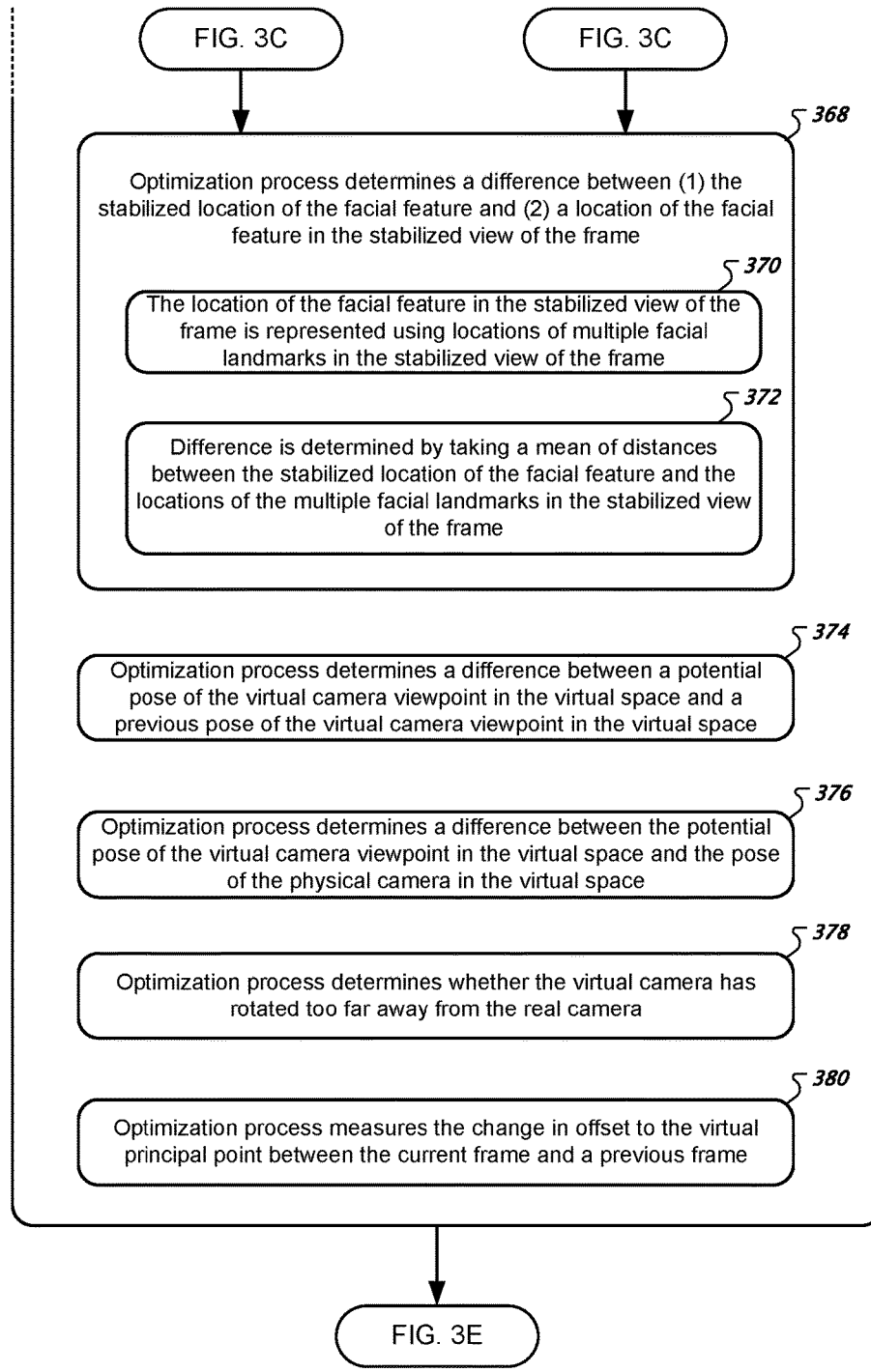
Figure 3E:
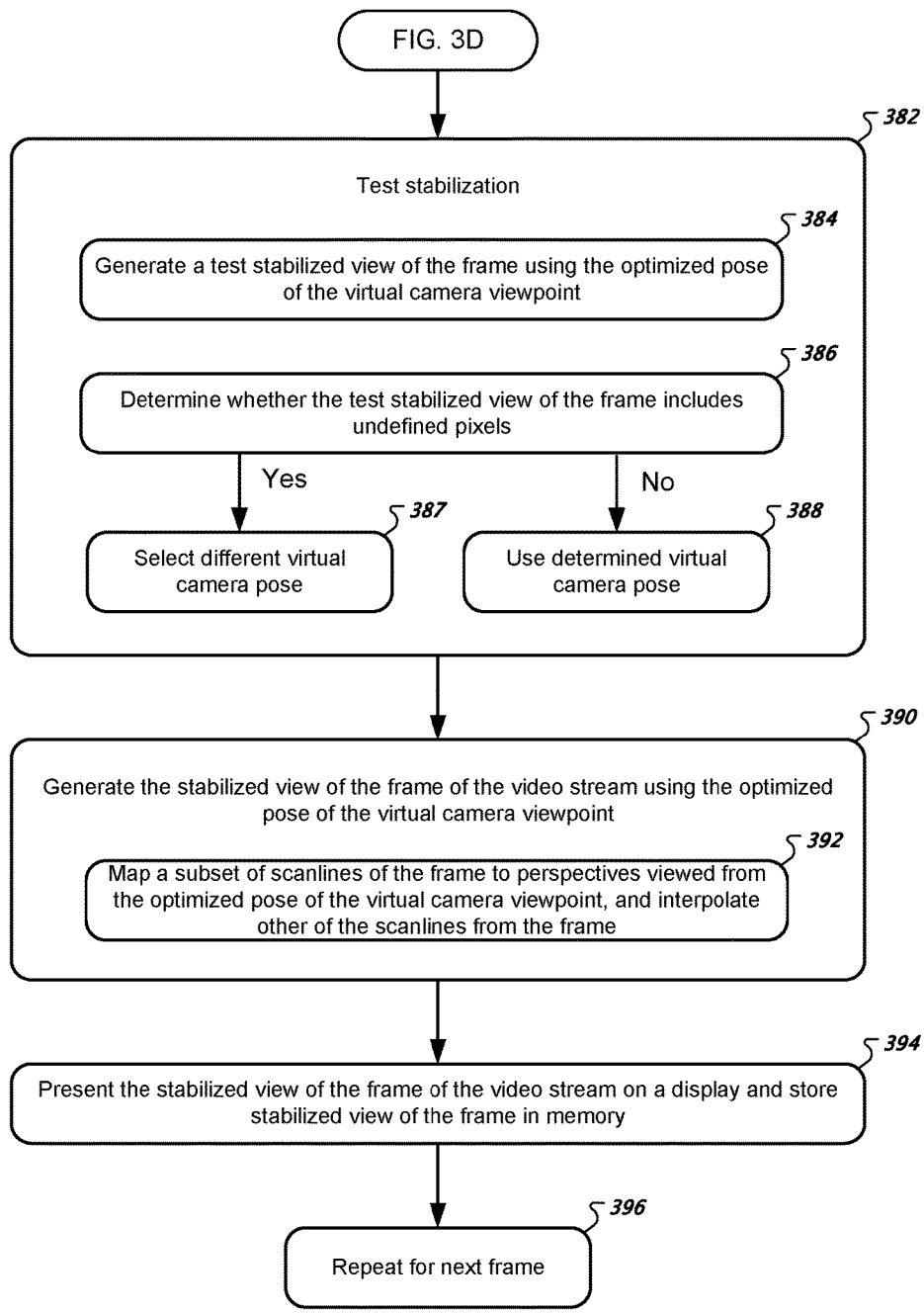

Referring now to the flowchart that begins in FIG. 3A, at box 310 a computing system receives a video stream that includes multiple frames. For instance, the computing system 220 that is depicted in FIG. 2 as a smartphone may record video using a front-facing camera 222. The recorded video may comprise a video stream 110, which is illustrated in FIG. 1 as including multiple component frames 120, 130, and 140. FIG. 1 shows an example in which the video stream 110 is being recorded in real-time, and frame 140 represents a most recently-captured frame, with frame 130 being a last frame that was captured, and frame 120 being the frame that was captured before that. Video stream 110 may include hundreds or thousands of frames that were captured at a pre-determined frame rate, such as 30 frames-per-second. Computing system 220 may store each of the frames to memory as they are captured. In some examples, video stream 110 may have been previously recorded, and frame 140 may represent a frame in the middle of the video stream 110.

At box 312, the computing system selects a target time for a selected frame. The selected frame may be the most-recently-captured frame in those examples in which the video stabilization is being performed in real time (e.g., frame 140 in FIG. 1), or may represent a frame in the middle of the video in those examples in which the video stabilization is being performed after the video has been captured. In some examples, the target time may defined as the beginning of the exposure duration for the frame, the end of the exposure duration for the frame, or some other time during the exposure duration for the frame. For instance, the computing system may define the target time for the selected frame as the middle of the exposure duration for the frame (box 314).

At box 316, the computing system selects a face depicted in the frame as a face to track from among multiple faces depicted in the frame. For example, the computing system may analyze the frame to identify each face in the frame and may then determine which of the identified faces to track. Regarding frame 140 in FIG. 1, the computing system may select to track face 150 rather than face 160 due to various factors, such as those described with respect to boxes 318, 320, and 322.

At box 318, the computing system selects a face based on sizes of each of the multiple faces. For example, the computing system may determine a size of a bounding box for each face, and may select a face with the largest bounding box.

At box 320, the computing system selects a face based on distances of each of the multiple faces to a center of the frame. For example, the computing system may identify a location of each face (described in more detail below with respect to box 330), and may determine a distance between that respective face and a center of the frame. The face that is closest to the center of the frame may be selected.

At box 322, the computing system may select a face based on distances between a location of the face selected in a previous frame and a location of each face in the current frame. This operation may help ensure that the system tracks the same face from frame to frame as the face moves around in the video.

The computing system may weight the operations of boxes 318, 320, and 322 the same or differently to produce an interest value for each face, and may compare the interest values of the faces to identify the face with the highest interest value. A threshold interest value can be defined, so that if no face has an interest value that exceeds the threshold, no face will be selected. The face-selection process can account for other factors, such as orientations of the faces, whether eyes are open in the faces, and which faces show smiles. The face-selection process can consider any combination of one or more of the above-described factors.

At box 330, the computing system may determine a location in the frame of a facial feature to track from the selected face. An example facial feature to track is the center of the face, although the computing system may track another facial feature, such as a person's nose or mouth center. Determining the center of a person's face can involve the operations of boxes 332, 334, and 336.

At box 332, the computing system identifies a bounding box for the selected face. The computing system may perform this identification using a face information extraction module.

At box 334, the computing system uses the center of the face as the facial feature. The computing system may determine the center of the face by identifying the location of multiple landmarks on the face and determining a mean location of those landmarks. Example landmarks include eye locations, ear locations, nose locations, eyebrow locations, mouth corner locations, and a chin location.

Although the operations of box 334 are described with reference to frame 140, this center-of-face determination process may be performed with respect to each frame in the video as that frame is stabilized. Because the depiction of frame 140 in FIG. 1 includes multiple annotations, annotations that illustrate the center-of-face determination is presented instead for frame 130 in FIG. 1, although it should be understood that the center-of-face determination process may be similar when applied to frame 140. Determining the center of face 150 in frame 130 can include the computing system identifying multiple landmarks on face 150, with the identified landmarks illustrated within dotted-rectangular boxes 170. The annotations that accompany frame 130 illustrate that the computing system has identified the location of eyes and mouth corners, although the computing system may identify other face landmarks. Through analysis of these landmark locations 170, the computing system determines that location 180 represents the mean location of the landmarks 170.

At box 336, the computing system determines the orientation of the face, and uses the face orientation to determine whether the face is in a profile mode. In some examples, the computing system may not track the location of the face if it is determined to be in profile mode.

At box 340, the computing system determines a stabilized location of the facial feature. Continuing the above-discussed example in which the face center the facial feature that is tracked, the computing system determines a stabilized center of the face (represented as location 182 in frame 140 of FIG. 1). The stabilized center of the face can represent a location at which the face center would be located had the face moved smoothly from the previous frame to the current frame. As such, the stabilized location of the face center may be selected to be not too far away from the real center of the face (represented as location 184 in frame 140 of FIG. 1), but the stabilized location of the face center is kept still if possible. As such, identifying the stabilized location of the face center can involve an optimization process that accounts for multiple different factors, as described with respect to boxes 342, 344, and 346.

At box 342, determining the stabilized location 182 of the facial feature accounts for the distance between a potential stabilized location and the actual location 184 of the facial feature (e.g., the mean of face landmarks). For example, the computing system may consider how far a potential stabilized face center strays from the actual, determined center of the face, to ensure that the stabilization does not attempt to stabilize the face so strongly that the video would depart substantially from the actual depiction of the face in the video. The term that accounts for this factor is referred to as E_follow, which measures how far away the stabilized two-dimensional center of the current frame H(T) is from the real landmark center C(T) that is determined as the mean of all 2D landmarks.

At box 344, determining the stabilized location 182 of the facial feature accounts for the distance between a potential stabilized location of the facial feature and a previously determined location 180 of the facial feature. For example, the computing system may consider how far a potential stabilized center strays from the location 180 of the last determined center of the face, to ensure that the stabilization does not attempt to track the current location of the face so strongly that the face makes sudden movements in the video. The term that accounts for this factor is referred to as E_smoothness, which measures the change between H(T) and H(T_pre), where H(T_pre) is the estimated 2D head center of the previous frame.

At box 346, determining the stabilized location of the facial feature accounts for a constraint on a distance between a potential stabilized location of the facial feature and the determined location of the facial feature. This factor is imposed as a hard constraint |H(T)−C(T)|<CroppedRange, so that C(T) moves within a valid range around H(T) which does not cause undefined regions.

An example process that combines these various terms to determine a stabilized location of the facial feature can be summarized as E_H(T)=w_1*E_smoothness+w_2*E_follow, such that |H(T)−C(T)|<CroppedRange. The values w_1 and w_2 are used to weight the smoothness and follow factors.

At box 348, the computing system determines a pose of the physical camera in virtual space. For the first frame of a video, the pose of the physical camera is referred to as R(t) and may be initialized with zero rotation and offset. The computing system may thereafter analyze signals received from one or more movement or rotation sensors to determine how the pose of the physical camera changes and a location for a subsequently-captured frame. For example, the computing system may receive a signal from a gyroscope at a high frequency (e.g., 200 Hz), and may use information in the signal to determine how the pose of the camera is changing and a current pose of the camera (where the current pose of the physical camera may have a different orientation and/or location than the initialized pose of the physical camera). In some examples, the computing system alternatively or additionally uses an accelerometer to determine the pose of the physical camera. The camera and the one or more movement or rotation sensors may be physical coupled to each other, such that the camera and the one or more sensors have the same movement and pose. For instance, the camera and the one or more sensors may be coupled to the same housing of a smartphone. The pose of the physical camera may be represented as a Quaternion representation (a 4D vector) that defines the camera pose in virtual space. The pose of the physical camera in virtual space is represented in FIG. 2 by camera 214. Determining poses of objects in virtual space can include assigning coordinates and orientations to the objects in a common coordinate system, and does not require generating a visual representation of the objects.

At box 350, the computing system maps the frame to virtual space. For example, the computing system may apply coordinates to the frame to represent locations of portions of the frame, such as the corners of the frame, with respect to the location in the virtual space of the physical camera. This mapping may be performed by constructing a projection matrix that maps the real world scene to the image, as illustrated in FIG. 2 by frame 230. Mapping the frame to the virtual space may account for various factors, described with respect to boxes 352 and 354.

At box 352, mapping the frame to virtual space accounts for the pose of the physical camera in virtual space. For example, the physical camera pose can be used to determine that the location of the frame should be in front of the physical camera with a principle point (e.g., a center) aligned with the orientation of the physical camera.

At box 354, mapping the frame to virtual space accounts for the focal lens of the physical camera and a current zoom setting of the physical camera. As an example, a frame that was captured using a camera without a fisheye lens and that was not zoomed in should span a larger portion of the virtual space in front of the physical camera than a frame that was captured using a camera without a fisheye lens that was zoomed in.

This process of mapping the frame into the virtual space can be represented by the equation P_(i, j_T)=R_(i,j_T)*K (i,j_T), where i is the frame index and j is the scanline index. R_(i, j_T) represents the pose of the physical camera, also referred to as the camera extrinsic matrix (a rotation matrix) obtained using the gyroscope information. K(i,j_T)=[f 0 Pt_x; f 0 Pt_y; 0 0 1] is the camera intrinsic matrix, where f is the focal length of current frame and Pt is the 2D principal point which is set to the image center.

At box 360, the computing system determines an optimized pose of a virtual camera viewpoint in the virtual space from which to generate a stabilized view of the frame using an optimization process. This optimization may be performed using a non-linear motion filtering engine, and can select a virtual camera viewpoint that smooths rotations and translations of the virtual camera viewpoint with respect to the physical camera. Selecting the optimized pose of the virtual camera viewpoint can involve selecting a position in virtual space of the virtual camera viewpoint and an orientation of the virtual camera viewpoint, one or both potentially being different from the location and orientation in virtual space of the physical camera.

The optimized pose of the virtual camera is illustrated in camera 212 in FIG. 2, and that pose can be determined using the optimization process that accounts for multiple factors, such as a pose of the physical camera (illustrated as camera 214 in FIG. 2), a pose of the virtual camera for a previous frame (illustrated as camera 210 in FIG. 2), and a distance between an actual location of a facial feature (e.g., face center 280 in FIG. 2) and a stabilized location of the facial feature (e.g., stabilized face center 282 in FIG. 2).

An example equation to determine the optimized pose of the virtual camera is $E\_V\_0(T) = w\_1 * E\_center + w\_2 * E\_rotation\_smoothness + w\_3 * E\_rotaton\_following + w\_4 * E\_distortion + w\_5 * E\_undefined\_pixel + w\_6 * E\_offset\_smoothness$. The terms included within this equation (e.g., E_center and E_rotation_smoothness) can an example virtual camera pose as an input and can output a value indicating suitableness of the virtual camera pose to the particular term. The virtual camera pose (also called virtual camera viewpoint herein) may be represented as $V\_0(T) = [R\_v(T), O\_v(T)]$ where $R\_v(T)$ is the virtual camera extrinsic matrix (a rotation matrix) and $O\_v(T)$ is a 2D offset of the virtual principal point Pt_v.

Selecting a given virtual camera pose can affect the value of each term in the above-illustrated equation, producing a resultant value for $E\_V\_0(T)$. Thus, different virtual camera poses may be input into the above-shown equation to determine different values for $E\_V\_0(T)$. Instead of inputting many different virtual camera poses into the above equation for $E\_V\_0(T)$ to identify the virtual camera pose with a best value, a nonlinear solver, such as the Ceres solver, may be used to determine an optimum virtual camera pose (e.g., a value that minimizes the value of $E\_V\_0(T)$). Although E_V_0 is a function of T, it may also be represented as a function of $R\_v(T)$ and $O\_v(T)$ because the value of T affects the values of $R\_v(T)$ and $O\_v(T)$ which affect the value of E_V_0, and therefore may alternatively be illustrated as $E\_V\_0(R\_v(T), O\_v(T))$. Additional detail regarding the determination of the optimized virtual camera pose is provided with reference to boxes 360-380.

At box 360, the computing system determines whether the optimization process is acting on the first frame of the video. If so, the computing system uses a virtual camera pose with zero rotation and zero offset as an initialization (box 364). If not, the computing system uses the virtual camera pose from the previous frame in the optimization process (box 366).

At box 368, the optimization process determines a difference between (1) the stabilized location of the facial feature, and (2) a location of the facial feature in a stabilized view the frame. This is the term of the optimization process that accounts for movement of the face. The affect and operation of this factor can be illustrated with respect to FIGS. 1 and 2.

As an illustration, FIG. 1 shows three frames 120, 130, and 140. Faces 150 and 160 are represented in each of these frames, and are positioned in different locations with respect to each other in the various frames to illustrate aspects of the technology described herein. Frame 120 shows initial locations of faces 150 and 160. Between frame 120 and 130, however, the camera may move (e.g., translate) to the right, causing the locations of faces 150 and 160 in frame 130 to shift to the left with respect to their locations in frame 120. In frame 140, the camera has not moved from the position it was at when it captured frame 130, but face 150 moved to the right in the frame 140 due to real-world movement of the face. (Face and camera movement would often occur simultaneously, but the movements are isolated to different frames in this illustration for ease of description.)

As described previously with respect to boxes 340-346, the computing system has determined that stabilized location 182 represents a stabilized position of face 150, for example, a desired center of face 150 that would stabilize movement of face 150 as it moves between frames 130 and 140. Stabilized location 182 is also illustrated in FIG. 2, which shows frame 140 mapped into virtual space as frame 230. As shown in frame 140 and also frame 230, the actual center of the user's face in the frames (determined based on face landmarks) is located to the right of the stabilized location 182 of the user's face 150, due to the user having moved to the right during the transition from frame 140 to frame 150.

FIG. 2 shows frame 230 from the perspective of physical camera 214, but the view and location of certain objects in the frame can change if the frame 230 were viewed from the perspective of the virtual camera 212 rather than the perspective of the physical camera 214. As an illustration, as the virtual camera 212 is moved around, the location of the stabilized location 182 may remain fixed but the location of face 150 may move around in the frame, just as the location of an object within your own field of vision may change if you step to the side and keep looking towards the object. With such an ability to move virtual camera 212 around to affect the location of face 150 in the image, an optimal stabilization of face 150 may include locating the virtual camera 212 so that the determined center of face 150, as viewed from the viewpoint of virtual camera 212, aligns with the stabilized location 182. The optimization algorithm, however, can account for factors, and therefore, the optimal location of the virtual camera 212 that is ultimately selected may not be positioned so that the determined center of face 150 perfectly aligns with the stabilized location 182.

At box 370, the location of the facial feature in the stabilized view of the frame may be represented using locations of multiple facial landmarks in the stabilized view of the frame. For example, the computing system may determine the location of multiple facial landmarks and these locations collectively may represent the location of the center of the face 150. Computations that account for the location of the facial feature (e.g., the center of the face 150) need not actually compute the location of the facial feature, and can instead use data from which the location of the facial feature as indicated, such as the locations of multiple landmark locations.

At box 372, the difference of box 368 is determined by taking a mean of distances between (1) the stabilized location of the facial feature and (2) the locations of the multiple facial landmarks in the stabilized view of the frame. In other words, the computing system may not actually calculate the location of the facial feature in the stabilized view of the frame. Rather, the system may determine how far each of the landmarks are in the stabilized view of the frame to the stabilized location of the facial feature, and can identify a virtual camera pose that minimizes that distance among all landmarks.

Referring back to the equation for $E\_V\_0(T)$, the operations of box 368 represent E_center, which can measure the mean of deviations between each projected landmark location on the virtual camera plane (e.g., the frame 140 viewed from the perspective of the virtual camera) and the estimated 2D head center H(T), which is the target head center on the virtual camera plane. For each detected landmark I, the computing system may identify the scanline to which it belongs, the computing system may compute the transformation to map the real image projected by $P\_(i,j)$ to $P\_v(T)$ for this scanline, and the computing system may map the landmark to the virtual camera plane to get its 2D location I_v. The deviation is then calculated as the L2 difference between I_v and H(T), i.e. $\|I\_v - H(T)\|^2$. The E_center term can ensure that the projected center of the selected face on the stabilized frame follows the estimated 2D head center H(T).

At box 374, the optimization process determines a difference between a proposed pose of the virtual camera viewpoint in the virtual space and a previous pose of the virtual camera viewpoint in the virtual space (e.g., a difference in locations and/or orientations). With reference to FIG. 2, the optimization process may account for the distance 216 between the pose 212 of the optimized virtual camera viewpoint and the previous pose 210 of the virtual camera viewpoint, which was used to generate the stabilized view of the previous frame 130. (This discussion sometimes refers to proposed poses of the virtual camera for simplicity of explanation, but it should be understood that such discussion is intended to cover optimization processes that may not actually test multiple different proposed poses, and instead perform an optimization process, for example, as described throughout this disclosure.)

Referring back to the equation for $E\_V\_0(T)$, the operations of box 374 can represent E_rotation_smoothness, the rotation smoothness term. This term measures the difference between the virtual camera pose for the current frame and the virtual camera pose for the previous frame. Rotation metrics such as l2 difference between the Quaternion representations (a 4D vector) can be used. This term can help ensure that the change in virtual camera pose occurs smoothly.

At box 376, the optimization process determines a difference between the proposed pose of the virtual camera viewpoint in the virtual space and the pose of the physical camera in the virtual space. With reference to FIG. 2, the optimization process may account for the distance 218 between the pose 212 of the optimized virtual camera viewpoint and the pose 214 of the physical camera.

Referring back to the equation for $E\_V\_0(T)$, the operations of box 376 can represent E_rotaton_following, the rotation following term. As mentioned above, this term can measure the difference between the virtual camera rotation (another way to reference virtual camera "orientation") for the current frame and the real camera rotation for the current frame, which can ensure the virtual camera rotation follows the real camera rotation.

At box 378, the optimization process determines whether the virtual camera has rotated too far away from the real camera. Referring back to the equation for $E\_V\_0(T)$, the operations of box 378 represent E_distortion, the distortion term. This term can measure the weighted spherical angle between the virtual camera rotation and the real camera rotation: $E = L(angle) * angle$, where the weight $L(angle) = 1/(1 + \exp(\beta\_1 * (angle - theta\_0)))$ is a Logistic regression that is close to 0 if angle is smaller than the threshold \beta_0, and close to 1 otherwise. The parameter \beta_1 controls how fast the transition from 0 to 1 goes. This term may only become effective (i.e., output a large value) when the virtual camera rotates too far away from the real camera. This term can help ensure that the virtual camera only rotates within a certain range from the real camera, and does not rotate far enough to cause visually observable perspective distortion.

At box 380, the optimization process measures the change in offset to the virtual principal point between the current frame and a previous frame (e.g., the immediately-preceding frame). Referring back to the equation for $E\_V\_0(T)$, the operations of box 380 represent E_offset_smoothness, the offset smoothness term. This term measures the change of offsets to the virtual principal point between the current and previous frames, and helps ensure that the offset changes smoothly across frames.

Referring back to the equation for $E\_V\_0(T)$, E_undefined_pixel, the undefined pixel term (not illustrated in FIGS. 3A-E) computes a transformation to map the real image projected by $P\_(i,j)$ to $P\_v(T)$ for each scanline, warps the video frame to the virtual camera plane, and measures the amount of undefined pixels in the warped frame. This term penalizes virtual pose solutions that would cause undefined pixels. A reference amount r may be used to control the sensitivity of the penalty, for example, so that E=amount of undefined pixel/r. By adjusting r to a large value, this term may output small values to disable the penalty. When r is small, this term can output large values to dominate the entire optimization and avoid the occurrence of undefined pixels.

The weights applied to the various terms in the equation for $E\_V\_0(T)$ may change for different frames. For example, when there is no valid face or there is no face detected in a frame, the weight $w\_1$ may be set to 0, so that the optimization process does not take face stabilization into account when determining the pose of the virtual camera. Furthermore, the weights $w\_1$-$w\_6$ may be changed based on landmark detection confidence. For example, when the landmark detection confidence is low, $w\_1$ can be decreased to avoid fitting to the unreliable landmarks, and when landmarks across frames are unstable, the smoothness-related weights can be increased to avoid virtual camera movement that may result from unstable landmarks. Furthermore, when the pose is large, the smoothness related weights can be increased to avoid virtual camera moves that may result from variations to the pose.

At box 382, the computing system tests the stabilization. It may perform this test by generating a test stabilized view of the frame of the video stream using the optimized pose of the virtual camera viewpoint (box 384). For instance, the computing system 220 may generate a stabilized view of frame 230 from the location 212 of the virtual camera. For example, from $V\_0(T)$, the computing system may compute the transformation to map the real image projected by $P\_(i,j)$ to $P\_v(T)$ for each scanline.

At box 386, the computing system determines whether the test stabilized view of the frame includes undefined pixels. If so, the computing system may select a different virtual camera viewpoint (box 387). In greater detail, the computing system may determine whether $P\_v(T)$ for each scanline would leave any pixels undefined in the output frame. If so, the reference amount r in the undefined pixel term may be too large. A binary search on this reference amount between a preset minimal value and its current value may be performed, and a maximum reference amount that does not cause undefined pixels may be selected, and the optimization result may be used as the final virtual camera pose V(T).

If the virtual camera viewpoint would not leave any undefined pixels, for example, because the computing system 220 determines that the stabilized view of frame 230 taken from the location 212 of the virtual camera does not include any undefined pixels, the computing system may use the determined virtual camera viewpoint as a final virtual camera viewpoint (box 388).

At box 390, the computing system generates the stabilized view of the frame using the optimized pose of the virtual camera viewpoint. For instance, an image warping engine can load the mapping output from a motion filtering engine, and can use the output to map each pixel in the input frame to an output frame. For instance, the computing system may use the final V(T) to generate the final virtual projection matrix P'_v(T), and can compute the final mapping for each scanline. This task is common in image and graphics processing systems, and different solutions can be implemented based on whether the process is to be optimized for performance or quality, or some blend of the two.

At box 392, the computing system generates the stabilized view of the frame by mapping a subset of scanlines of the frame to perspectives viewed from the optimized pose of the virtual camera viewpoint, and interpolates other of the scanlines from the frame. For instance, Instead of calculating P_(i,j) and mappings for every single scanline, the computing system may compute only a subset of the scanlines, and can use interpolation in between to generate the dense mapping.

At box 394, the computing system presents the stabilized view of the frame of the video stream on a display and stores the stabilized view of the frame in memory. In some examples, the presentation of the stabilized view of the frame is performed in real-time while the video is being recorded, for example, before a next frame is captured or shortly after the frame is captured (e.g., before another 2, 5, 10, or 15 frames is captured during an ongoing recording). In some examples, storing the stabilized view of the frame in memory can include deleting or otherwise not persistently storing the original, un-stabilized frame. As such, upon the computing system finishing a video recording, the computing system may store a stabilized version of the video and may not store an unstabilized version of the video.

At box 396, the computing system repeats this process for the next frame of the video, for example, by starting the process back at box 312 with the next frame, unless the video includes no more frames.

The techniques described herein can be used to stabilize video to reduce movement of a camera and movement of a non-face object. For example, the computing system may track the center of another type of moving object, such as a football being thrown or a vehicle moving across the frame, and stabilize the video to reduce not only movement of the camera but also movement of the non-face object.

Further to the descriptions above, a user may be provided with controls allowing the user to make an election as to both if and when systems, programs or features described herein may enable collection of user information (e.g., information about a location of a device). Any location information may be generalized as to where location information is obtained (such as to a city, ZIP code, or state level), so that a particular location of a user cannot be determined. Thus, the user may have control over what information is collected about the user, how that information is used, and what information is provided to the user. Moreover, any location-determinations performed with respect to the technologies described herein may identify only a pose of a device relative to an initial pose when video recording began, not absolute geographical location of the device.

Figure 4:
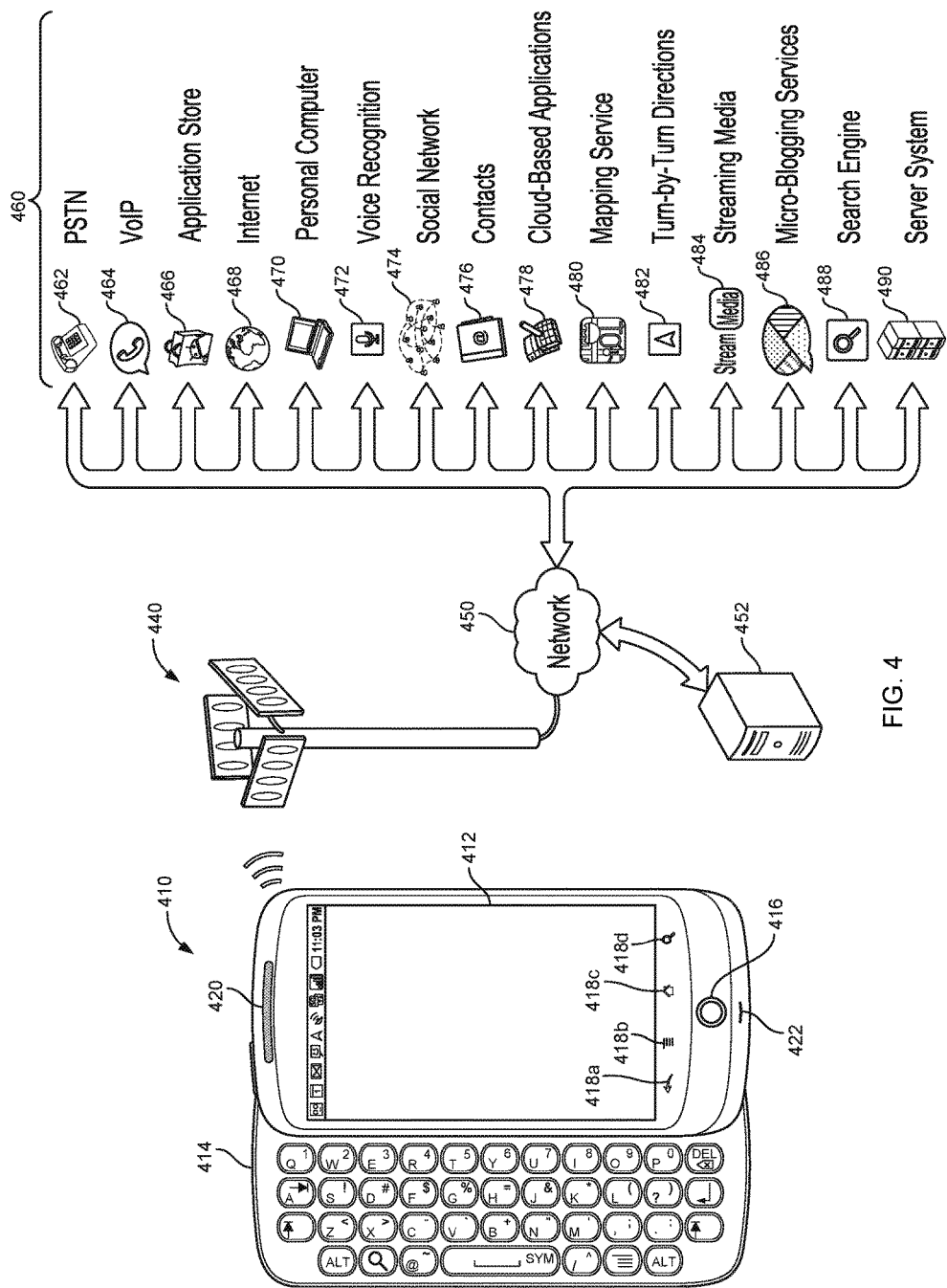
FIG. 4 is a conceptual diagram of a system that may be used to implement the systems and methods described in this document.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or an application telephone) that includes a touchscreen display device 412 for presenting content to a user of the mobile computing device 410 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 414, physical buttons, trackballs, accelerometers, gyroscopes, and magnetometers).

Example visual output mechanism in the form of display device 412 may take the form of a display with resistive or capacitive touch capabilities. The display device may be for displaying video, graphics, images, and text, and for coordinating user touch input locations with the location of displayed information so that the device 410 can associate user contact at a location of a displayed item with the item. The mobile computing device 410 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a track pad enables the user to supply directional and rate of movement information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" graphical user interface that is displayed after turning on the mobile computing device 410, after activating the mobile computing device 410 from a sleep state, after "unlocking" the mobile computing device 410, or after receiving user-selection of the "home" button 418c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 410 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 410 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 410. The mobile device 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., ETHERNET, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computing systems that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing systems associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call using a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 5:
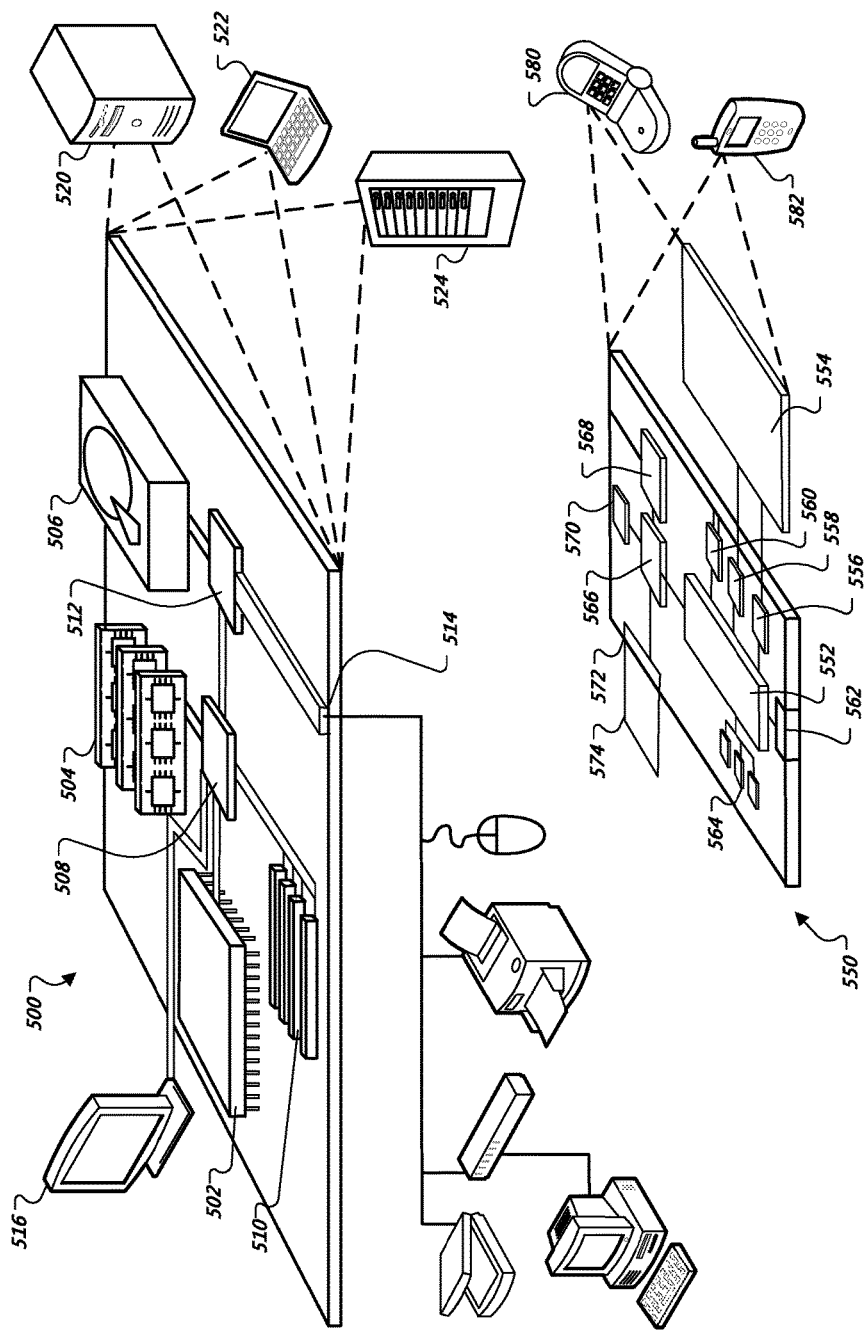
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provided, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented video stabilization method, comprising:
   receiving, by a computing system, a video stream that includes multiple frames and that was captured by a physical camera;
   determining, by the computing system and in a frame of the video stream that was captured by the physical camera, a location of a facial feature of a face that is depicted in the frame;
   determining, by the computing system, a stabilized location of the facial feature, taking into account a previous location of the facial feature in a previous frame of the video stream that was captured by the physical camera;
   determining, by the computing system and using information received from a movement or orientation sensor coupled to the physical camera, a pose of the physical camera in a virtual space;
   mapping, by the computing system, the frame of the video stream that was captured by the physical camera into the virtual space;
   determining, by the computing system, an optimized pose of a virtual camera viewpoint in the virtual space from which to generate a stabilized view of the frame, using an optimization process that:
     (i) determines a difference between the stabilized location of the facial feature and a location of the facial feature in a stabilized view of the frame viewed from a potential pose of the virtual camera viewpoint;
     (ii) determines a difference between the potential pose of the virtual camera viewpoint in the virtual space and a previous pose of the virtual camera viewpoint in the virtual space; and
     (iii) determines a difference between the potential pose of the virtual camera viewpoint in the virtual space and the pose of the physical camera in the virtual space; and
   generating, by the computing system, the stabilized view of the frame using the optimized pose of the virtual camera viewpoint in the virtual camera space.

2. The computer-implemented video stabilization method of claim 1, further comprising:
   presenting, by the computing system, the stabilized view of the frame on a display of the computing system.

3. The computer-implemented video stabilization method of claim 1, wherein the movement or orientation sensor comprises a gyroscope.

4. The computer-implemented video stabilization method of claim 1, wherein:
   the computing system determines the location the facial feature of the face that is depicted in the frame based on locations of multiple respective facial landmarks that are depicted in the frame; and
   the computing system determines the difference between the stabilized location of the facial feature and the location of the facial feature in the stabilized view of the frame by measuring deviations between locations of the multiple facial landmarks in the stabilized view of the frame and the stabilized location of the facial feature.

5. The computer-implemented video stabilization method of claim 1, wherein the optimization process comprises a non-linear computational solver that optimizes values for multiple respective variables.

6. The computer-implemented video stabilization method of claim 1, wherein the optimization process:
   determines an amount of undefined pixels in the stabilized view of the frame that is generated using the potential pose of the virtual camera view point in the virtual space.

7. The computer-implemented video stabilization method of claim 1, wherein the optimization process:
   determines a difference between:
     (a) an offset of a principal point of the stabilized view of the frame that is generated using the potential pose of the virtual camera view point in the virtual space, and
     (b) an offset of a previous principal point of a previous stabilized view of the frame that was generated using the previous pose of the virtual camera viewpoint in the virtual space.

8. The computer-implemented video stabilization method of claim 1, wherein generating the stabilized view of the frame includes mapping a subset of scanlines of the frame to perspectives viewed from the optimized pose of the virtual camera viewpoint, and interpolating other of the scanlines of the frame.

9. The computer-implemented video stabilization method of claim 1, further comprising:
   selecting the face that is depicted in the frame of the video stream that was captured by the physical camera as a face to track from among multiple faces depicted in the frame of the video stream that was captured by the physical camera by:
     selecting the face based on sizes of each of the multiple faces,
     selecting the face based on distances of each of the multiple faces to a center of the frame, or
     selecting the face based on distances between a face selected for tracking in a previous frame and each of the multiple faces.

10. The computer-implemented video stabilization method of claim 1, wherein the optimized pose of the virtual camera viewpoint has a different location and rotation in the virtual space than the pose of the physical camera.

11. A computerized system, comprising:
    a camera;
    a motion or orientation sensor physically coupled to the camera;
    one or more processors;
    one or more non-transitory computer-readable devices including instructions that, when executed by the one or more processors, cause performance of operations that include:
      receiving, by a computing system, a video stream that includes multiple frames and that was captured by a physical camera;
      determining, by the computing system and in a frame of the video stream that was captured by the physical camera, a location of a facial feature of a face that is depicted in the frame;
      determining, by the computing system, a stabilized location of the facial feature, taking into account a previous location of the facial feature in a previous frame of the video stream that was captured by the physical camera;

determining, by the computing system and using information received from a movement or orientation sensor coupled to the physical camera, a pose of the physical camera in a virtual space;

mapping, by the computing system, the frame of the video stream that was captured by the physical camera into the virtual space;

determining, by the computing system, an optimized pose of a virtual camera viewpoint in the virtual space from which to generate a stabilized view of the frame, using an optimization process that:

(i) determines a difference between the stabilized location of the facial feature and a location of the facial feature in a stabilized view of the frame viewed from a potential pose of the virtual camera viewpoint;

(ii) determines a difference between the potential pose of the virtual camera viewpoint in the virtual space and a previous pose of the virtual camera viewpoint in the virtual space; and (iii) determines a difference between the potential pose of the virtual camera viewpoint in the virtual space and the pose of the physical camera in the virtual space; and generating, by the computing system, the stabilized view of the frame using the optimized pose of the virtual camera viewpoint in the virtual camera space.

12. The computerized system of claim 11, wherein the operations further comprise:

presenting, by the computing system, the stabilized view of the frame on a display of the computing system.

13. The computerized system of claim 11, wherein the movement or orientation sensor comprises a gyroscope.

14. The computerized system of claim 11, wherein:

the computing system determines the location the facial feature of the face that is depicted in the frame based on locations of multiple respective facial landmarks that are depicted in the frame; and the computing system determines the difference between the stabilized location of the facial feature and the location of the facial feature in the stabilized view of the frame by measuring deviations between locations of the multiple facial landmarks in the stabilized view of the frame and the stabilized location of the facial feature.

15. The computerized system of claim 11, wherein the optimization process comprises a non-linear computational solver that optimizes values for multiple respective variables.

16. The computerized system of claim 11, wherein the optimization process:

determines an amount of undefined pixels in the stabilized view of the frame that is generated using the potential pose of the virtual camera view point in the virtual space.

17. The computerized system of claim 11, wherein the optimization process:

determines a difference between:

(a) an offset of a principal point of the stabilized view of the frame that is generated using the potential pose of the virtual camera view point in the virtual space, and (b) an offset of a previous principal point of a previous stabilized view of the frame that was generated using the previous pose of the virtual camera viewpoint in the virtual space.

18. The computerized system of claim 11, wherein generating the stabilized view of the frame includes mapping a subset of scanlines of the frame to perspectives viewed from the optimized pose of the virtual camera viewpoint, and interpolating other of the scanlines of the frame.

19. The computerized system of claim 11, wherein the operations further comprise:

selecting the face that is depicted in the frame of the video stream that was captured by the physical camera as a face to track from among multiple faces depicted in the frame of the video stream that was captured by the physical camera by:

selecting the face based on sizes of each of the multiple faces, selecting the face based on distances of each of the multiple faces to a center of the frame, or selecting the face based on distances between a face selected for tracking in a previous frame and each of the multiple faces.

20. The computerized system of claim 11, wherein the optimized pose of the virtual camera viewpoint has a different location and rotation in the virtual space than the pose of the physical camera.

* * * * *